United States Patent
Depierro et al.

(10) Patent No.: US 12,460,052 B2
(45) Date of Patent: Nov. 4, 2025

(54) POLY(DIORGANO/ORGANOHYDROGEN)SILOXANE COPOLYMERS

(71) Applicants: Dow Silicones Corporation, Midland, MI (US); Dow Global Technologies LLC, Midland, MI (US)

(72) Inventors: Michael Depierro, Midland, MI (US); Xiaoyun Chen, Midland, MI (US); Michael Hausinger, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 414 days.

(21) Appl. No.: 18/042,628

(22) PCT Filed: Dec. 2, 2021

(86) PCT No.: PCT/US2021/061530
§ 371 (c)(1),
(2) Date: Feb. 23, 2023

(87) PCT Pub. No.: WO2022/132446
PCT Pub. Date: Jun. 23, 2022

(65) Prior Publication Data
US 2023/0331920 A1    Oct. 19, 2023

Related U.S. Application Data

(60) Provisional application No. 63/125,015, filed on Dec. 14, 2020.

(51) Int. Cl.
*C08G 77/10* (2006.01)
*C08G 77/12* (2006.01)

(52) U.S. Cl.
CPC ............. *C08G 77/10* (2013.01); *C08G 77/12* (2013.01)

(58) Field of Classification Search
CPC .................................. C08G 77/10; C08G 77/12
See application file for complete search history.

(56) References Cited

U.S. PATENT DOCUMENTS

| | | |
|---|---|---|
| 2,823,218 A | 2/1958 | Speir et al. |
| 3,183,209 A | 5/1965 | Hartung et al. |
| 4,329,273 A | 5/1982 | Hardman et al. |
| 4,370,358 A | 1/1983 | Hayes et al. |
| 4,707,531 A | 11/1987 | Shirahata |
| 4,772,515 A | 9/1988 | Hara et al. |
| 5,118,559 A | 6/1992 | DeVoe et al. |
| 5,137,072 A | 8/1992 | Traspadini |
| 5,310,843 A | 5/1994 | Morita |
| 5,638,172 A | 6/1997 | Alsmeyer et al. |
| 5,929,186 A | 7/1999 | Sun et al. |
| 6,395,538 B1 | 5/2002 | Naughton et al. |
| 6,448,196 B1 | 9/2002 | Eglin et al. |
| 6,479,597 B1 | 11/2002 | Long et al. |
| 6,723,804 B1 | 4/2004 | Battiste |
| 6,867,858 B2 | 3/2005 | Owen et al. |
| 7,122,379 B2 | 10/2006 | Wolf et al. |
| 7,133,784 B2 | 11/2006 | Vaidyanathan et al. |
| 7,145,028 B2 | 12/2006 | Geisberger et al. |
| 8,322,199 B2 | 12/2012 | Reed |
| 8,686,175 B2 | 4/2014 | Gehrig et al. |
| 8,722,834 B2 | 5/2014 | Knott et al. |
| 9,040,605 B2 | 5/2015 | Deshpande et al. |
| 9,568,462 B2 | 2/2017 | Reed |
| 9,678,002 B2 | 6/2017 | Miao et al. |
| 10,197,500 B2 | 2/2019 | Reed et al. |
| 10,352,770 B2 | 7/2019 | Morales Rodriguez et al. |
| 10,620,127 B2 | 4/2020 | Reed et al. |
| 2003/0130433 A1 | 7/2003 | Wenz et al. |
| 2004/0176532 A1 | 9/2004 | Buchholz et al. |
| 2004/0198827 A1 | 10/2004 | Battiste |
| 2006/0262300 A1 | 11/2006 | Gylys et al. |
| 2009/0037027 A1 | 2/2009 | Battiste |
| 2011/0237816 A1* | 9/2011 | Gehrig .................. C08G 77/08 556/451 |
| 2012/0007017 A1 | 1/2012 | Tabei et al. |
| 2012/0085151 A1 | 4/2012 | Konrad et al. |

FOREIGN PATENT DOCUMENTS

| | | |
|---|---|---|
| EP | 0786488 | 7/1997 |
| EP | 0878498 | 11/1998 |
| JP | 11140190 | 5/1999 |
| JP | 2002021228 | 1/2002 |
| WO | 2001/006233 | 1/2001 |
| WO | 2010074831 | 7/2010 |

OTHER PUBLICATIONS

"A Process Analytical Concept for In-Line FTIR Monitoring of Polysiloxane Formation" authored by Steinbach et al. and published in Polymers (2020) 12, 2473; doi:10.3390/polym 12112473.*
Infrared Analysis of Organosilicon Compounds: Spectra-Structure Correlations authored by Launer et al. and published in Silanes & Silicones, 2013, Gelest Inc.*
Becke., "A multicenter numerical integration scheme for polyatomic molecules." The Journal of Chemical Plastics. 1988, p. 2547-2553,vol. 88.
Becke., "Density-functional approximation with correct asymptotic behavior.", Physical Review A., 1988, vol. 38, pp. 3098.
Biancolillo., "Data-Fusion for multiplatform characterization of an Italian craft beer aimed at its authentication.", Anal. Chem. Acta., 2014, pp. 23-31.
De Juan., "Multivariate Curve Resolution (MCR) from 2000: Progress in Concepts and Applications.", Crit. Rev. Anal. Chem., 2006, Abstract, vol. 36.
Fan., "Application of density functional theory to infrared absorption intensity calculations on main group molecules.", The Journal of Chemical Physics., 1992, pp. 9005-9012, vol. 96.

(Continued)

*Primary Examiner* — Marc S Zimmer
(74) *Attorney, Agent, or Firm* — Catherine U. Brown

(57) ABSTRACT

A method for preparing a poly(diorgano/organohydrogen) siloxane copolymer is provided. The method includes use of a vibrational spectroscopy technique.

15 Claims, 8 Drawing Sheets

(56) References Cited

OTHER PUBLICATIONS

Franchini., "The Becke fuzzy cells integration scheme in the Amsterdam Density Functional program suite." J. Comput. Chem. 2013, pp. 1819-1827, vol. 34.
Garrido., "Multivariate curve resolution-alternating least squares (MCR-ALS) applied to spectroscopic data from monitoring chemical reactions processes.", Anal. Bioanal. Chem., 2008, Abstract, vol. 390.
Guerra., "Towards an order-N DFT method.", Theor. Chem. Acc., 1998, pp. 39-403, vol. 99.
Haaland., "Application of New Least-squares Methods for the Quantitive Infrared Analysis of Multicomponent Samples.", Applied Spectroscience., 1982, vol. 36, pp. 665-673.
Haaland., "Multivariate Least-Squares Methods Applied to the Quantitive Spectral Analysis of Multicomponent Samples." Applied Spectroscience. 1985, p. 73-84, vol. 39.
Haaland., "Partial least-squares methods for spectral analyses. 1. Relation to other quantitive calibration methods and the extraaction of qualitative information." Anal. Chem. 1988, p. 1193-1202, vol. 60.
Harwood., "The Characterization of sequence distribution in copolymers." Journal of Polymer Science Part B: Polymer Letter. 1964, p. 601-607, vol. 2.
Jayes, "Vibrational Spectroscopic Analysis of Silicones: Fourier Transform-Raman and Inelastic Neutron Scattering Investigation", Anal. Chem., 2003, vol. 75, pp. 742-746.
Jayes., "Vibrational spectroscopic analysis of silicones: A Fourier transform-Raman and inelastic neutron scattering Investigating." Anal. Chem. 1988, pp. 1193-1202, vol. 60.
Jiang., "Self Modeling Curve Resolution (SMCR): Principles, techniques and applications." Appl. Spectrosc. Rev. 2002, p. 321-345, vol. 37.
Lipp, Comment on "Vibrational Spectroscopic Analysis of Silicones: A Fourier Transform-Raman and Inelastic Neutron Scattering Investigation", Anal. Chem. 2005, vol. 77, p. 4290.
Marquez., "FT-Raman and NIR spectroscopy data fusion for multivariate qualitative analysis of food fraud.", 2016, pp. 80-86.
Mayo, "Copolymerization. I. A basis for Comparing the Behavior of Monomers in Copolymerization: The copolymerization of Styrene and Methyl Methacrylate" J. Am. Chem. Soc, 1944, vol. 66, 9, pp. 1594-1601.
Perdew., "Density-functional exchange-energy approximation with correct asymptotic behavior." Physical Review B. 1986, p. 8822, vol. 33.
Van Lenthe., "Optimized Slater-type basis sets for the elements 1-118.", J. Comput. Chem., 2003, pp. 1142-1156, vol. 24.
Velde., "Chemistry with ADF." J. Comput. Chem., 2001, vol. 22, pp. 931-967.
Ziemelis., "Sequence Distribution in Poly(dimethylsiloxane-co-methylvinylsiloxanes." Macromolecules. 1989, p. 2111-2116, vol. 22, No. 22.

\* cited by examiner

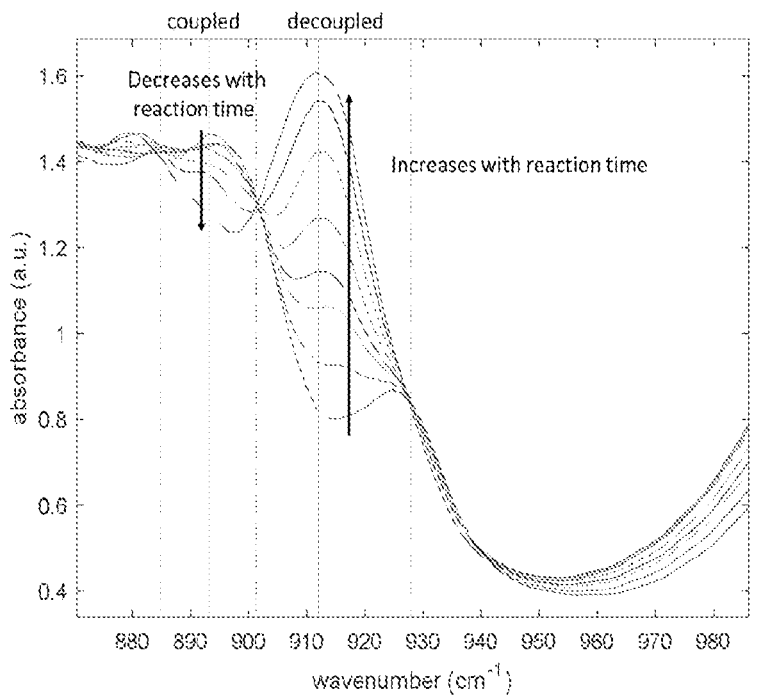

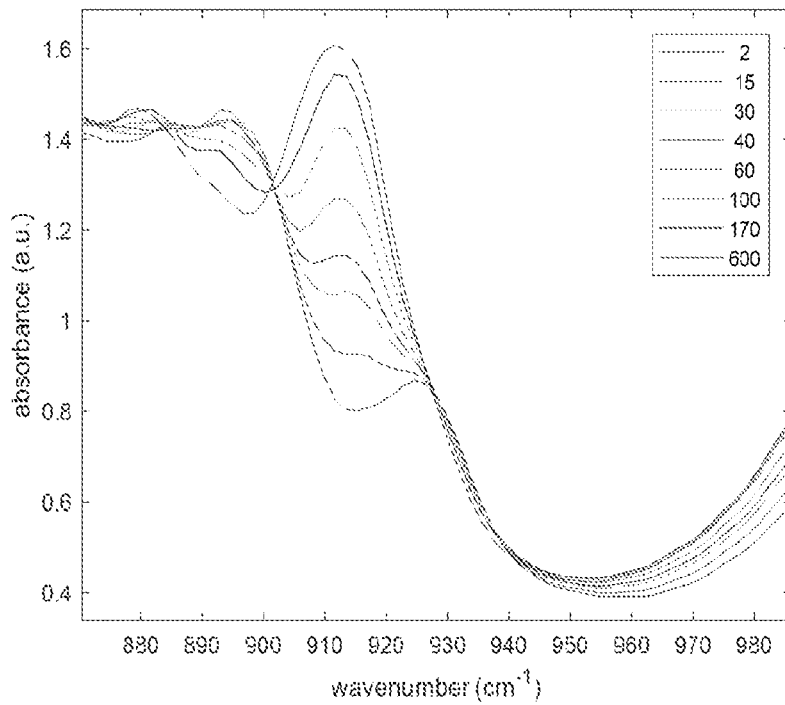

Figure 1. IR spectra showing location of decoupled and coupled SiH peaks as measured in Example 1. The vertical axis represents absorbance units. The horizontal axis represents wavenumber (cm$^{-1}$). Vertical dashes denote baseline points. Vertical solid lines denote peak centers. Arrows denote progression of the peak height during the reaction. The arrow on the left denotes that the coupled peak decreases with reaction time, and the arrow on the right denotes that the decoupled peak increases with reaction time.

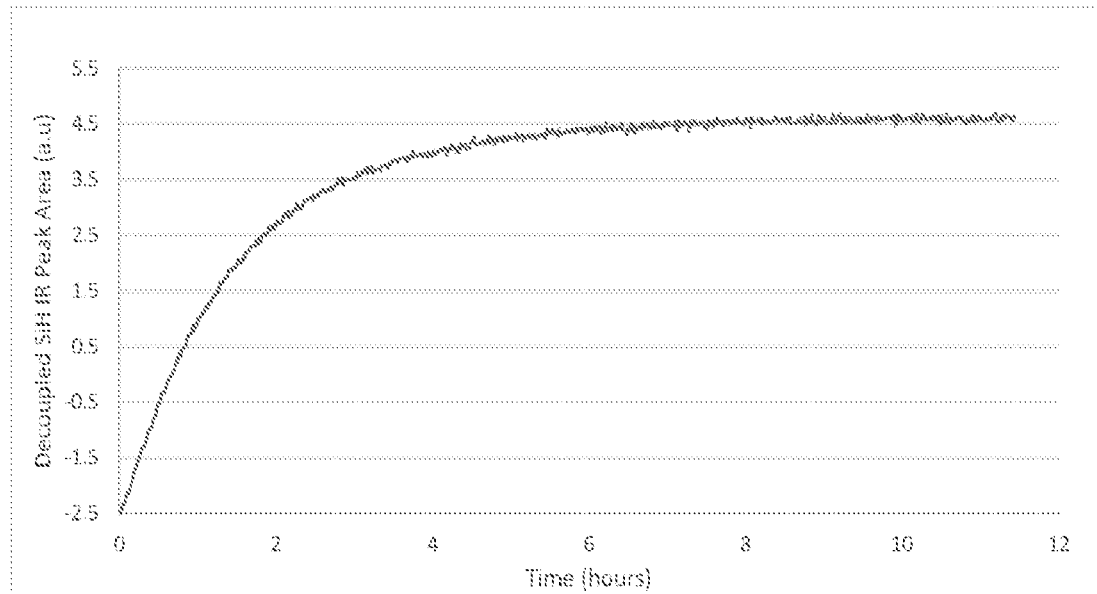

Figure 2. Decoupled SiH peak area measured by IR with respect to reaction time in Example 1. The vertical axis represents SiH IR Peak Area (absorbance units, a.u.) and the horizontal axis represents time in hours.

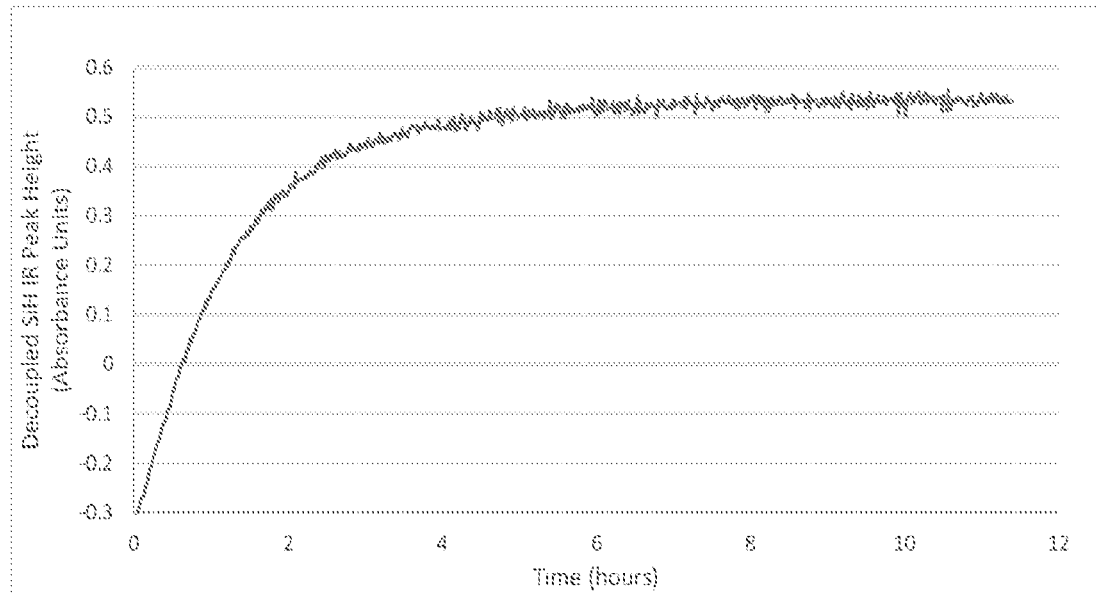

Figure 3. Decoupled SiH peak height measured by IR with respect to reaction time in Example 1. The vertical axis shows decoupled SiH IR Peak Height (absorance units, a.u.). The horizontal axis shows time (hours).

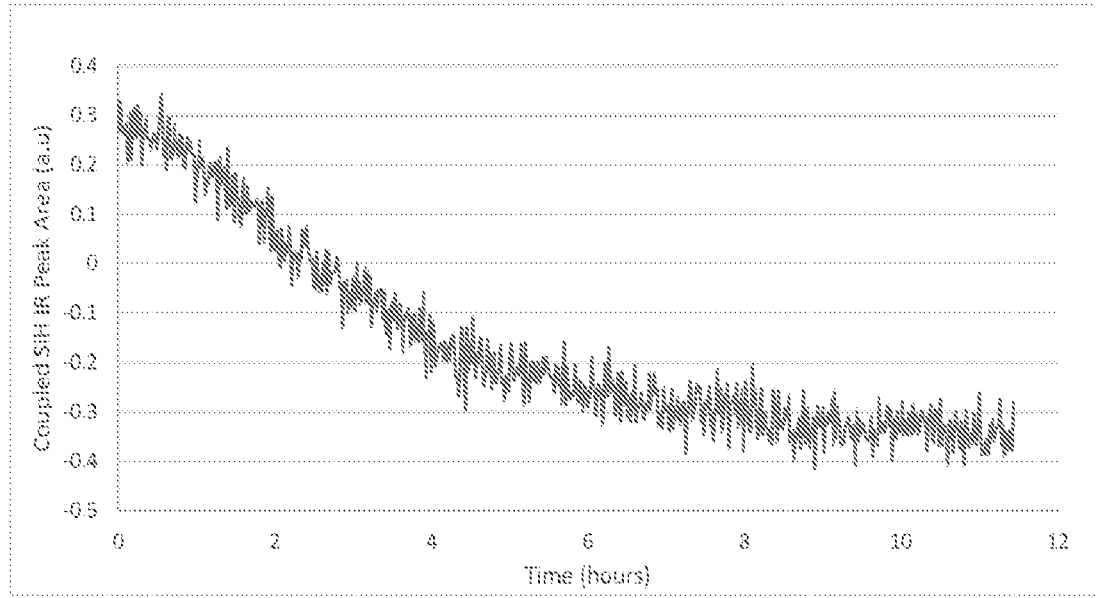
Figure 4. Coupled SiH peak area measured by IR with respect to reaction time in Example 1. The vertical axis shows coupled SiH IR Peak Area (a.u.). The horizontal axis shows time (hours).
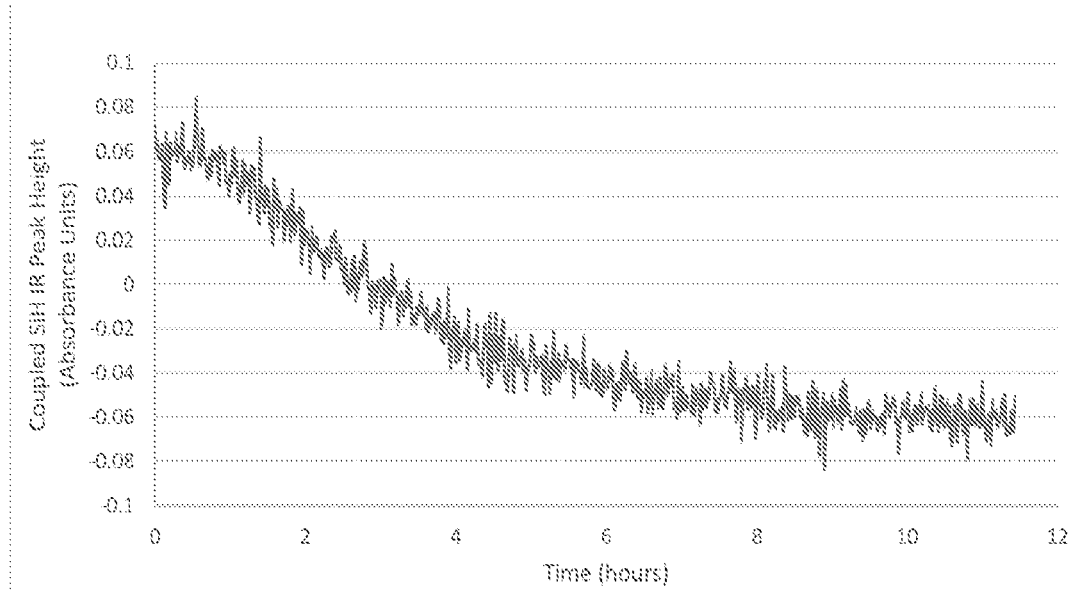
Figure 5. Coupled SiH peak height measured by IR with respect to reaction time in Example 1. The vertical axis shows coupled SiH IR Peak Height (a.u.). The horizontal axis shows time (hours).

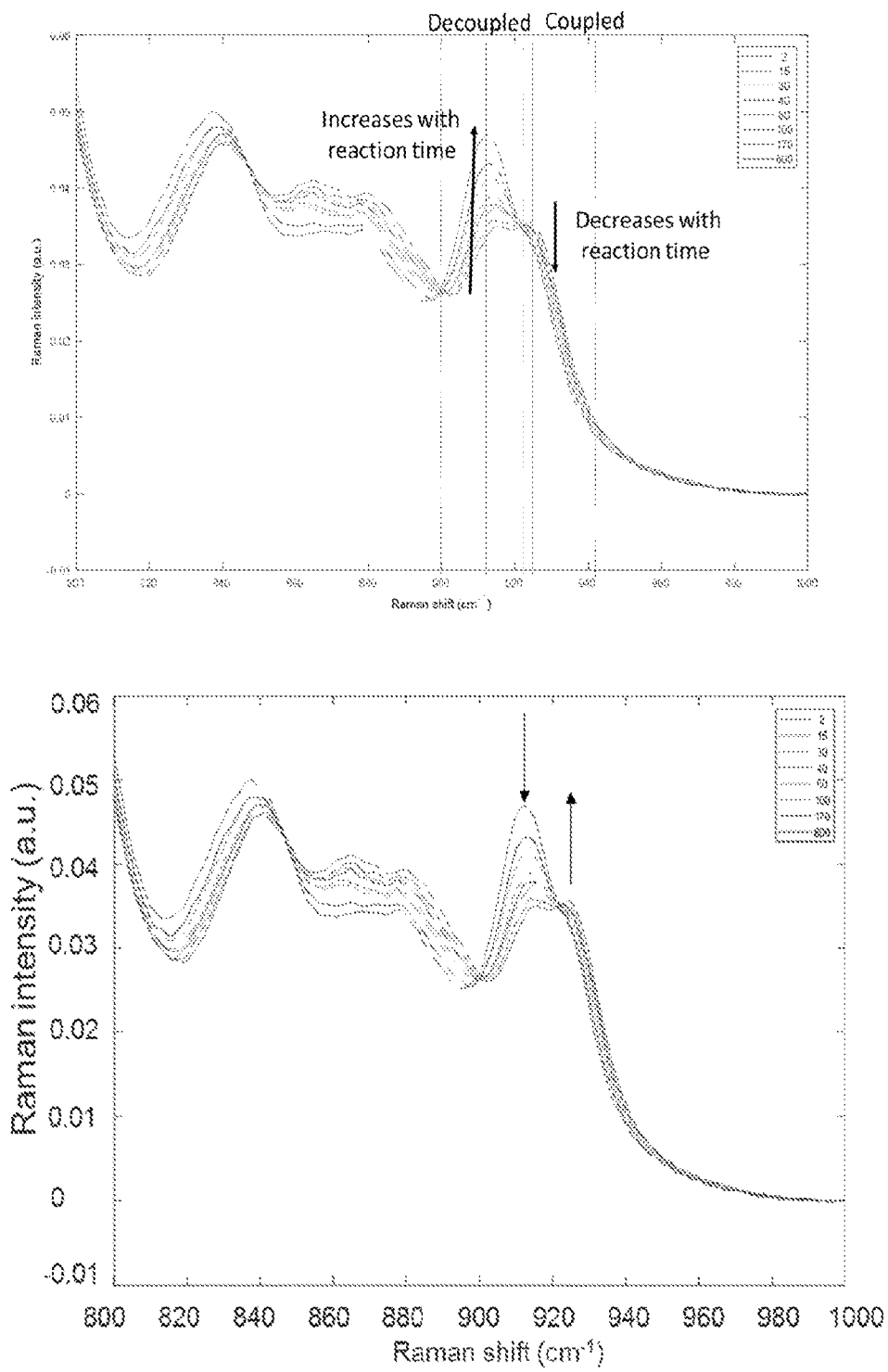

Figure 6. Raman spectra showing location of decoupled and coupled SiH peaks as measured in Example 1. The vertical axis represents Raman intensity (absorbance units). The horizontal axis represents Raman shift (cm$^{-1}$). Vertical dashed lines denote baseline points. Vertical solid lines denote peak centers. Arrows denote progress of the peak height as the reaction progresses. The arrow on the right denotes that the coupled peak decreases with reaction time, and the arrow on the left denotes that the decoupled peak increases with reaction time.

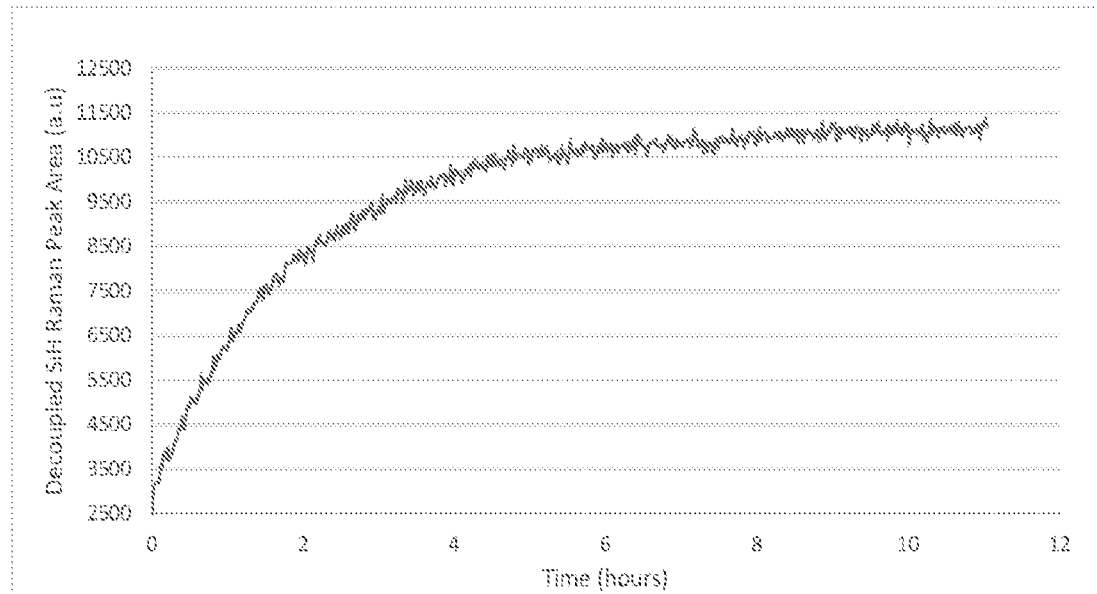

Figure 7. Decoupled SiH peak area measured by Raman with respect to reaction time in Example 1. The vertical axis shows decoupled SiH Raman peak area (a.u.). The horizontal axis shows time (hours).

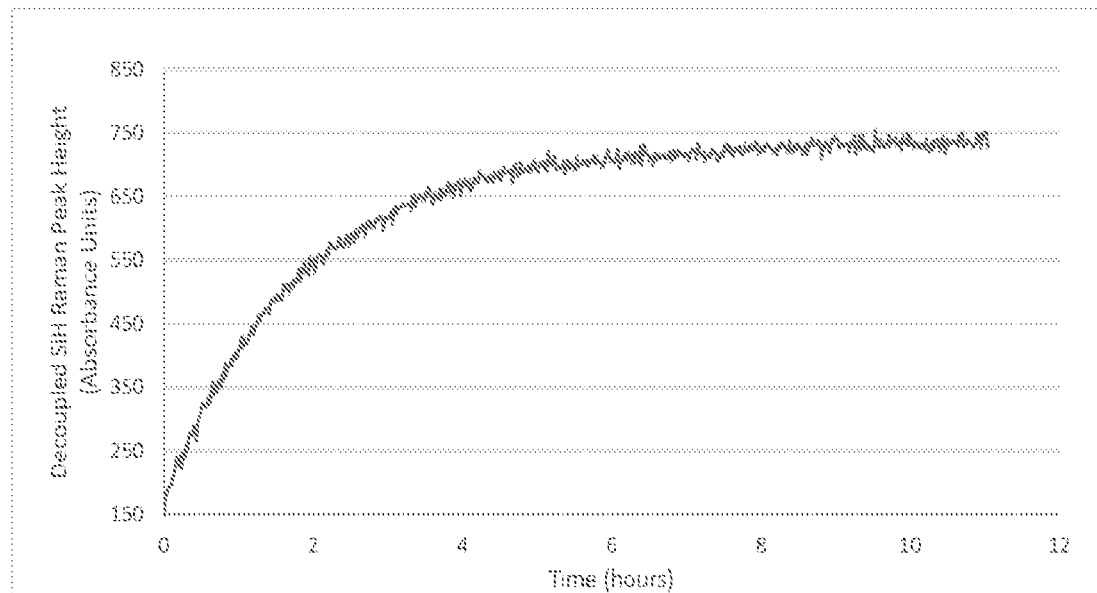

Figure 8. Decoupled SiH peak height measured by Raman with respect to reaction time in Example 1. The vertical axis shows decoupled SiH Raman peak height (a.u.). The horizontal axis shows time (hours).

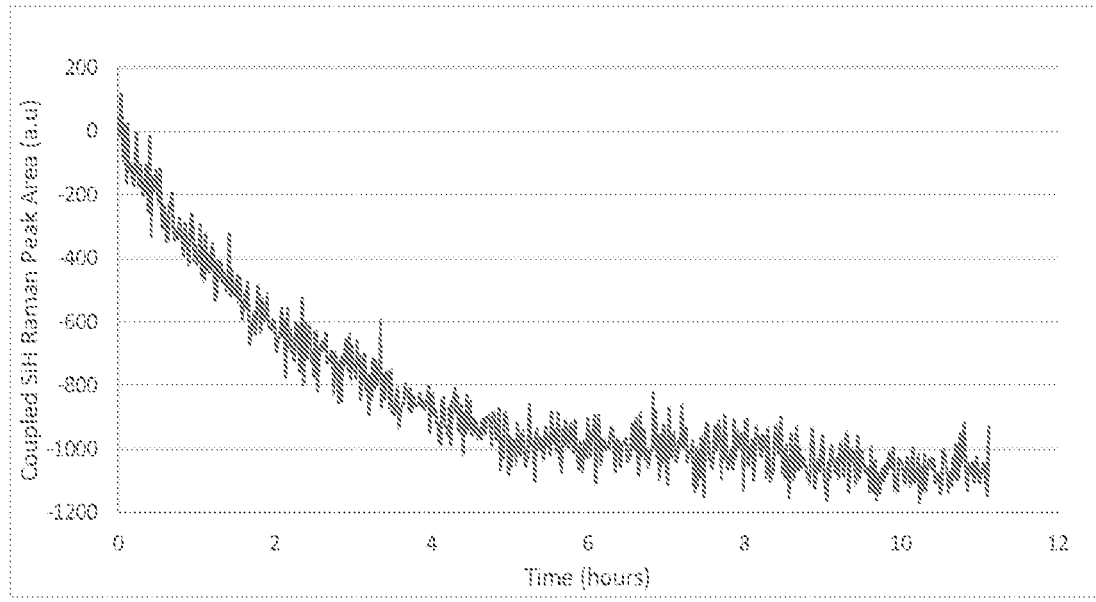

Figure 9. Coupled SiH peak area measured by Raman with respect to reaction time in Example 1. The vertical axis shows coupled SiH Raman peak area (a.u.). The horizontal axis shows time (hours).

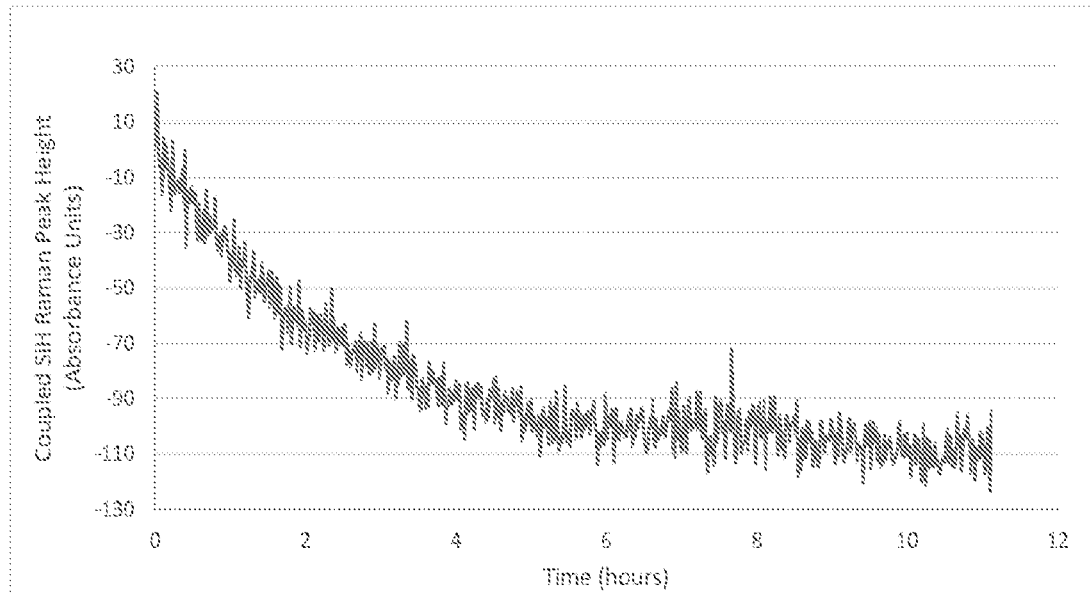

Figure 10. Coupled SiH peak height measured by Raman with respect to reaction time in Example 1. The vertical axis shows coupled SiH Raman peak height (a.u.). The horizontal axis shows time (hours).

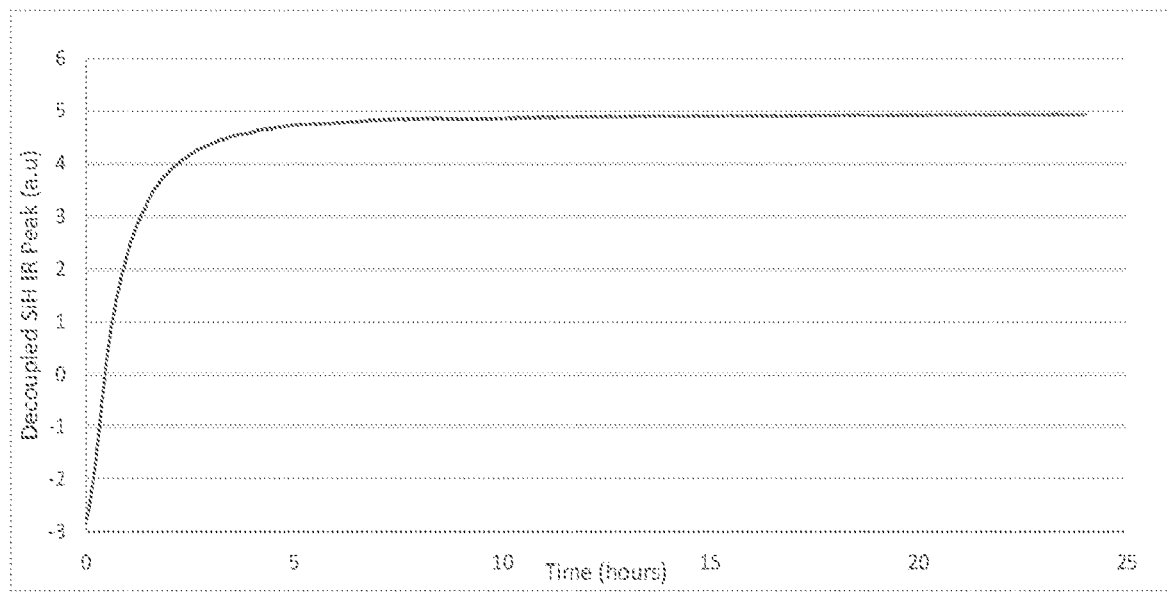
Figure 11. Decoupled SiH peak area measured by IR as a function of reaction time in Example 2. The vertical axis shows decoupled SiH IR peak area (a.u.). The horizontal axis shows time (hours).
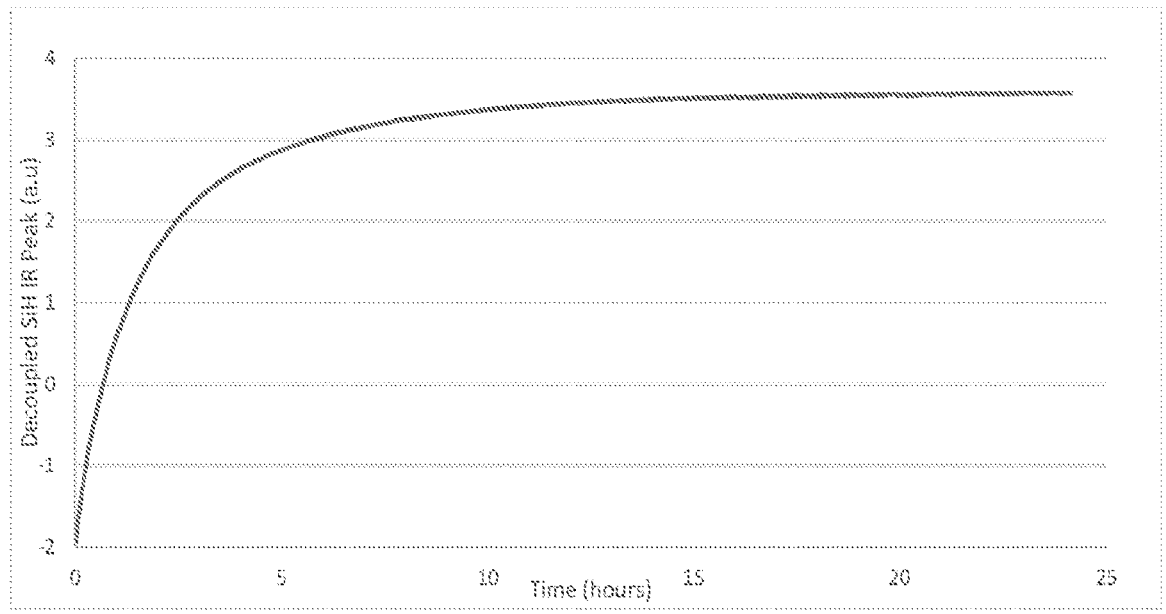
Figure 12. Decoupled SiH peak area measured by IR as a function of reaction time in Example 3. The vertical axis shows decoupled SiH IR peak area (a.u.). The horizontal axis shows time (hours).

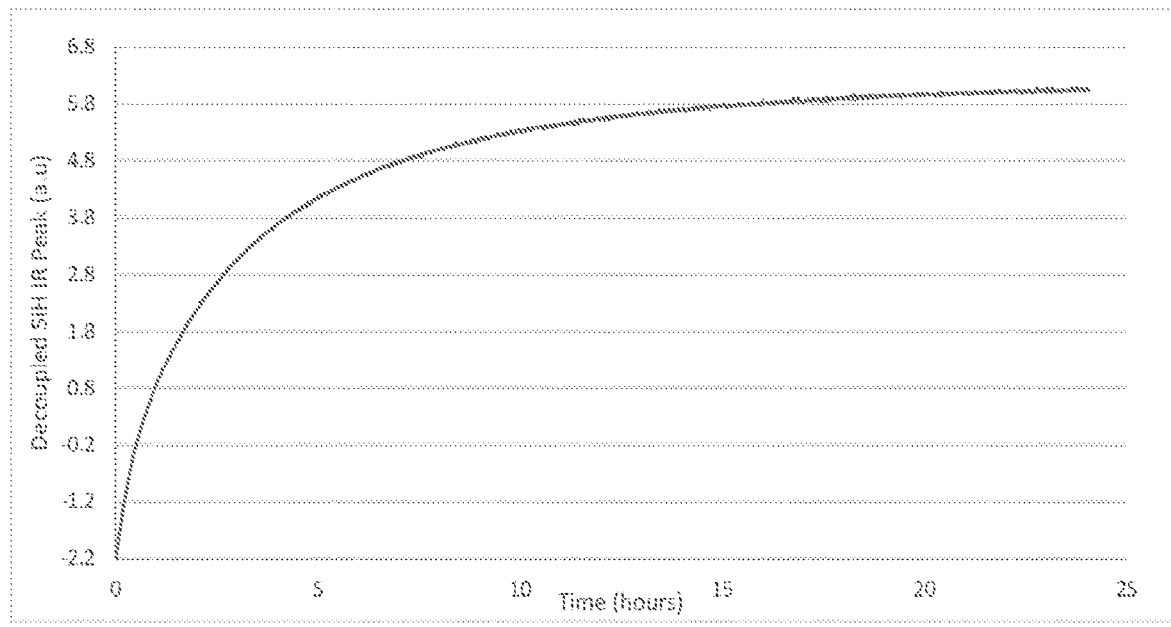
Figure 13. Decoupled SiH peak area measured by IR as a function of reaction time in Example 4. The vertical axis shows decoupled SiH IR peak area (a.u.). The horizontal axis shows time (hours).
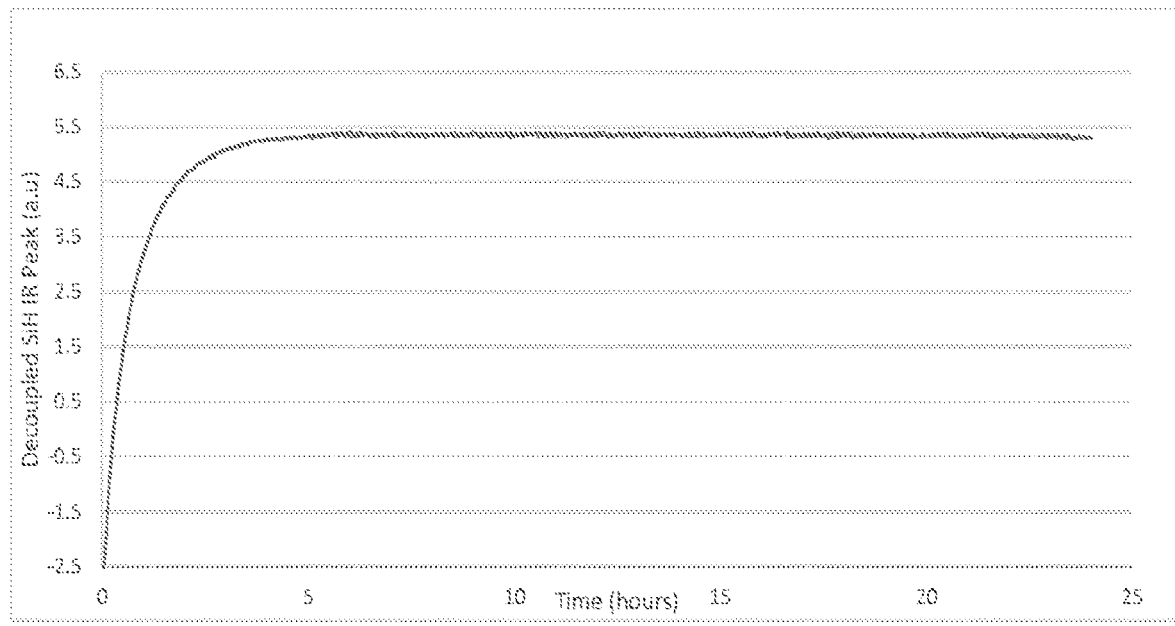
Figure 14. Decoupled SiH peak area measured by IR as a function of reaction time in Example 5. The vertical axis shows decoupled SiH IR peak area (a.u.). The horizontal axis shows time (hours).

POLY(DIORGANO/ORGANOHYDROGEN) SILOXANE COPOLYMERS

CROSS REFERENCE TO RELATED APPLICATIONS

This application is a U.S. national stage filing under 35 U.S.C. § 371 of PCT Application No. PCT/US2021/061530 filed on 2 Dec. 2021, currently pending, which claims the benefit of U.S. Provisional Patent Application No. 63/125,015 filed 14 Dec. 2020 under 35 U.S.C. § 119 (e). PCT Application No. PCT/US2021/061530 and U.S. Provisional Patent Application No. 63/125,015 are each hereby incorporated by reference.

TECHNICAL FIELD

A method for preparing a poly(diorgano/organohydrogen)siloxane copolymer is disclosed. More particularly, the method produces a copolymer with a desired sequence distribution of units of formula $HRSiO_{2/2}$ ($D^H$ units), where each R is a monovalent hydrocarbyl group or halogenated hydrocarbyl group.

INTRODUCTION

U.S. Pat. No. 8,686,175 discloses a process for producing siloxanes. This process comprises reacting at least two siloxanes in the presence of an ion exchange resin catalyst comprising from 6 to 19 weight % water, based upon the dry weight of the ion exchange resin catalyst and at a temperature from ambient to 110° C. Also disclosed is a process for reusing the ion exchange resin catalyst after the reacting of the at least two siloxanes in the presence of the ion exchange resin catalysts comprising adding water to the ion exchange resin catalyst to readjust the water content to from 6 to 19 weight % water, based on the dry weight of the catalyst, and then reacting at least two siloxanes in the presence of the readjusted water content ion exchange resin catalyst.

NMR has been used to characterize polyorganohydrogensiloxanes, but suffers from the drawbacks that real time analysis of the reaction mixture for producing polyorganohydrogensiloxanes on a commercial scale is difficult, expensive, and impractical using NMR techniques. Therefore, previous processes may suffer from the drawback of poor productivity because it may be desirable to stop the reaction at, or very shortly after, reaching the desired polyorganohydrogensiloxane product structure to minimize processing time. However, time to reach the desired product structure can vary from batch to batch for various reasons, including the particular siloxanes selected as reactants and variability in process conditions such as the temperature selected. As a result, the time needed to achieve the desired product will vary from batch to batch.

SUMMARY

A method for preparing a poly(diorgano/organohydrogen)siloxane copolymer is provided herein. The method comprises:
1) combining starting materials comprising
   A) a source of siloxane units of formula $(R_2SiO_{2/2})$,
   B) a source of siloxane units of formula $(RHSiO_{2/2})$, where each R is independently selected from the group consisting of a monovalent hydrocarbyl group and a monovalent halogenated hydrocarbyl group, and
   C) an acid catalyst, thereby forming a mixture;
2) agitating the mixture at a temperature of 20° C. to 110° C., thereby forming a reaction mixture comprising the poly(diorgano/organohydrogen)siloxane copolymer via equilibration reaction;
3) using a vibrational spectroscopy technique selected from the group consisting of infra-red spectroscopy and Raman spectroscopy to monitor a spectral region including an absorbance band that corresponds to one or both of a concentration of decoupled ($RHSiO_{2/2}$) units and a concentration of coupled ($RHSiO_{2/2}$) units in the reaction mixture;
4) stopping the equilibration reaction when a target related to the absorbance band is reached.

BRIEF DESCRIPTION OF THE FIGURES

FIG. 1 shows IR spectra showing location of decoupled and coupled ($RHSiO_{2/2}$) absorbance bands (SiH peaks) as measured in Example 1, below. Vertical dashed lines denote baseline points. Vertical solid lines denote peak centers.

FIG. 2 shows decoupled SiH peak area with respect to reaction time as measured by IR in Example 1.

FIG. 3 shows decoupled SiH peak height with respect to reaction time measured by IR in Example 1.

FIG. 4 shows coupled SiH peak area with respect to reaction time measured by IR in Example 1.

FIG. 5 shows coupled SiH peak height with respect to reaction time measured by IR in Example 1.

FIG. 6 shows Raman spectra showing location of decoupled and coupled SiH peaks measured in Example 1. Vertical dashed lines denote baseline points. Vertical solid lines denote peak centers.

FIG. 7 shows decoupled SiH peak area with respect to reaction time measured by Raman spectroscopy in Example 1.

FIG. 8 shows decoupled SiH peak height with respect to reaction time measured by Raman spectroscopy in Example 1.

FIG. 9 shows coupled SiH peak area with respect to reaction time measured by Raman spectroscopy in Example 1.

FIG. 10 shows coupled SiH peak height with respect to reaction time measured by Raman spectroscopy in Example 1.

FIG. 11 shows decoupled SiH peak area as a function of reaction time measured by IR in Example 2.

FIG. 12 shows decoupled SiH peak area as a function of reaction time measured by IR in Example 3.

FIG. 13 shows decoupled SiH peak area as a function of reaction time measured by IR in Example 4.

FIG. 14 shows decoupled SiH peak area as a function of reaction time as measured by IR in Example 5.

DETAILED DESCRIPTION OF THE INVENTION

Step 1) of the method described above in the SUMMARY comprises combining starting materials comprising: A) a source of siloxane units of formula $(R_2SiO_{2/2})$, B) a source of siloxane units of formula $(RHSiO_{2/2})$, where each R is independently selected from the group consisting of a monovalent hydrocarbyl group and a monovalent halogenated hydrocarbyl group, and C) an acid catalyst, thereby forming a mixture.

Starting materials A) and B) may be one or more polyorganosiloxane(s), which comprise unit formula: $(R_3SiO_{1/}$ $_2)_t(R_2HSiO_{1/2})_u(R_2SiO_{2/2})_v(RHSiO_{2/2})_w(RSiO_{3/2})_x(HSiO_{3/2})_y(SiO_{4/2})_z$, where subscripts t, u, v, w, x, y, and z represent amounts of each unit, t≥0, u≥0, v≥1, w≥1, x≥0, y≥0, z≥0, with the provisos that a quantity (v+w)≥3, a quantity (x+y+z) is 0 to a value sufficient to provide up to 20 mol % of siloxane units in the molecule; a quantity (t+u+v+w)≥3. Alternatively, (t+u+v+w) may have a value greater than or equal to 3, alternatively 3 to 2,000; alternatively 3 to 1,000; alternatively 3 to 500; alternatively 3 to 300; and alternatively 3 to 200. In this unit formula, each R is independently selected from the group consisting of a monovalent hydrocarbyl group and a monovalent halogenated hydrocarbyl group. Alternatively, when the polyorganosiloxane is linear or cyclic, the quantity (x+y+z)=0.

Suitable monovalent hydrocarbyl groups for R are exemplified by alkyl, alkenyl, and aryl groups. The alkyl groups for R may be methyl, ethyl, propyl (including n-propyl and/or isopropyl), butyl (including n-butyl, t-butyl, sec-butyl, and/or isobutyl), pentyl (including cyclopentyl, n-pentyl, and branched isomeric species with 5 carbon atoms), hexyl (including cyclohexyl, n-hexyl, and branched isomeric species with 6 carbon atoms), heptyl (including cycloheptyl, n-heptyl, and branched isomeric species with 7 carbon atoms), octyl (including cyclooctyl, n-octyl, and branched isomeric species with 8 carbon atoms), nonyl (including cyclononyl, n-nonyl, and branched isomeric species with 9 carbon atoms), and decyl (including cyclodecyl, n-decyl, and branched isomeric species with 10 carbon atoms). Suitable alkenyl groups for R may be selected from the group consisting of vinyl, allyl, and hexenyl; alternatively vinyl and hexenyl; and alternatively vinyl. Suitable aryl groups for R are exemplified by, but not limited to, cyclopentadienyl, phenyl, anthracenyl, naphthyl, tolyl, xylyl, benzyl, phenylethyl, phenyl propyl, and phenyl butyl. Suitable monovalent halogenated hydrocarbyl groups for R are monovalent hydrocarbyl groups (such as those described above) where one or more hydrogen atoms bonded to a carbon atom have been formally replaced with a halogen atom. Halogenated hydrocarbon groups include haloalkyl groups and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl groups such as chloromethyl, 3-chloropropyl, 2,2-dichlorocyclopropyl, and 2,3-dichlorocyclopentyl. Haloalkenyl groups include chloroallyl. Alternatively, each R may be a monovalent hydrocarbyl group. Alternatively, each R may be an alkyl group. Alternatively, each R may be selected from methyl, ethyl, propyl or butyl; alternatively methyl or ethyl; and alternatively methyl.

Starting materials A) and B) may be the same molecule, when a polyorganosiloxane has both a ($R_2SiO_{2/2}$) unit and a ($RHSiO_{2/2}$) unit. Alternatively, starting materials A) and B) may be different molecules.

For example, starting material A) may be selected from the group consisting of: A1) a cyclic polydiorganosiloxane of unit formula $(R_2SiO_{2/2})_c$, where 3≤c is ≤12; A2) a linear polyorganosiloxane comprising unit formula $(R_3SiO_{1/2})_a(R_2HSiO_{1/2})_d(R_2SiO_{2/2})_b$, where a quantity (a+d)=2, and 3≤b≤200; and A3) a combination of both A1) and A2). In the unit formulas for A1) and A2), each R is as described above. Alternatively, each R may be an independently selected monovalent hydrocarbyl group, alternatively an alkyl group, and alternatively methyl. Alternatively, in starting material A1), subscript c may be greater than or equal to 3, alternatively 3≤c is ≤9, alternatively 3≤c is ≤6, and alternatively 4≤c is ≤6. Alternatively, in starting material A2), subscript d may be 0. Cyclic polydiorganosiloxanes suitable for use as starting material A1) are known in the art and are commercially available. For example, phenylmethylcyclosiloxanes and dimethylcyclosiloxanes, exemplified by octaorganocyclotetrasiloxanes such as 2,2,4,4,6,6,8,8,-octamethylcyclotetrasiloxane; decaorganocyclopentasiloxanes such as 2,2,4,4,6,6,8,8,-decamethylcyclopentasiloxane; and dodecaorganocyclohexasiloxanes such as 2,2,4,4,6,6,8,8,10,10-dodecamethylcyclohexasiloxane are known in the art and are commercially available from various sources such as Dow Silicones Corporation of Midland, Michigan, USA; Gelest, Inc. of Morrisville, Pennsylvania, USA; and Sigma-Aldrich, Inc. of St. Louis, Missouri, USA. Suitable linear polyorganosiloxanes suitable for use as starting material A2) include trimethylsiloxy-terminated polydimethylsiloxanes, which are also known in the art and are commercially available from the same sources listed above. For example, trimethylsiloxy-terminated polydimethylsiloxanes with viscosities of 5, 10, 50, 500, and 1,000 cSt are commercially available from Dow Silicones Corporation of Midland, Michigan, USA. Viscosity may be measured at 25° C. and 0.1 to 50 RPM on a Brookfield DV-III cone & plate viscometer with #CP-52 spindle. One skilled in the art would recognize that rotation rate decreases as viscosity increases and would be able to select the appropriate rotation rate when using this test method to measure viscosity. Alternatively, suitable dimethylhydrogen-siloxy-terminated polydimethylsiloxanes may be used as starting material A2), and these are also known in the art and commercially available from various vendors including Gelest, Inc., under the tradenames: DMS-HM15, DMS-H03, DMS-H25, DMS-H31, and DMS-H41. Alternatively, starting material A) may be free of silicon bonded hydrogen atoms.

Starting material B) may be selected from the group consisting of: B1) a cyclic polyorganohydrogensiloxane of unit formula $(HRSiO_{2/2})_c$, where 3≤c≤12; B2) a linear polyorganohydrogensiloxane of unit formula $(R_3SiO_{1/2})_a(R_2HSiO_{1/2})_d(RHSiO_{2/2})_e$, where a quantity (a+d)=2, and 3≤e≤200; and B3) a combination of both B1) and B2). In the unit formulas for B1) and B2), each R is as described above. Alternatively, in starting material B), each R may be an independently selected monovalent hydrocarbyl group, alternatively an alkyl group, and alternatively methyl. Alternatively, in the unit formula for B1), subscript c may greater than or equal to 3, alternatively 3≤c is ≤9, alternatively 3≤c is ≤6, and alternatively 4≤c is ≤6. Alternatively, in the unit formula for B2), subscript d may be 0. Suitable organohydrogencyclosiloxanes for starting material B1) are known in the art and are commercially available. For example, organohydrogencyclosiloxanes, exemplified by organohydrogencyclotetrasiloxanes such as 2,4,6,8,-tetramethyl-2,4,6,8-tetrahydro-cyclotetrasiloxane; organohydrogencyclopentasiloxanes such as 2,4,6,8,10-pentamethyl-2,4,6,8,10-tetrahydro-cyclopentasiloxane; and organohydrogencyclohexasiloxanes such as 2,4,6,8,10,12-hexamethyl-2,4,6,8,10,12-tetrahydro-cyclohexasiloxane are known in the art and are commercially available from various sources such as Dow Silicones Corporation and Gelest, Inc. Alternatively, suitable linear polyorganohydrogensiloxanes for starting material B2) are also known in the art and are commercially available or may be made by known methods. For example, bis-trimethylsiloxy-terminated polymethylhydrogensiloxane homopolymer, and bistrimethylsiloxy-terminated poly(dimethyl/methylhydrogen) siloxane copolymer, bis-dimethylhydrogensiloxy-terminated polymethylhydrogensiloxane homopolymer, and bis-dimethylhydrogensiloxy-terminated poly(dimethyl/methylhydrogen)siloxane copolymer may be used. Suitable polyorganohydrogensiloxanes are also commercially available, such as those available from Gelest, Inc. under the tradenames HMS-H271, HMS-071, HMS-993, HMS-301, HMS-301 R, HMS-031, HMS-991, HMS-992, HMS-993, HMS-082, HMS-151, HMS-013, HMS-053, HAM-301, HPM-502, and HMS-HM271. Methods of preparing linear polyorganohydrogensiloxanes, such as hydrolysis and condensation of organohalosilanes, are well known in the art, as exemplified in U.S. Pat. No. 2,823,218 to Speier, et al.; U.S. Pat. Nos. 5,310,843; 4,370,358; 4,707,531; and 4,329,273.

Starting material C) is a catalyst suitable for catalyzing equilibration reaction in the method described herein. The catalyst may be homogeneous or heterogeneous. Suitable homogeneous catalysts include sulfonic acids such as toluene sulfonic acid and trifluoromethanesulfonic acid (triflic acid). Suitable heterogeneous catalysts include acid-activated bleaching earths (bentonites, montmorillonites, or Fuller's earths), acid clays such as tonsil clay and Filtrol™ acid clays which are commercially available from Sigma-Aldrich, Inc., and ion exchange resins such as sulphonated macrocrosslinked cation exchange resins. Various ion exchange resins are known in the art and are commercially available, e.g., under the tradename AMBERLYST™ from the DuPont de Nemours, Inc. of Wilmington, Delaware, USA. Catalysts suitable for use as starting material C) are known in the art, for example, the acid catalysts disclosed in U.S. Pat. No. 2,823,218 to Speier, et al.; U.S. Pat. Nos. 5,310,843; 4,370,358; 4,707,531; and 4,329,273. Alternatively, the catalyst may be a heterogeneous catalyst. Heterogeneous catalysts are exemplified by those disclosed, for example, in U.S. Pat. No. 8,686,175 to Gehrig, et al., and U.S. Pat. No. 8,722,834.

The amount of starting material C), the catalyst, is sufficient to catalyze the equilibrium reaction. The exact amount of C) the catalyst depends on various factors such as whether the catalyst is homogeneous or heterogenous and whether the method is performed in a batch or continuous manner, however, the amount of catalyst may be >0 to 10 weight %, alternatively >0 to 5%, based on combined weights of starting materials A), B), C), D), and E) used in the method. Alternatively, the amount of heterogeneous catalyst used in a batch process may be >0 to 5%, alternatively, >0 to 2%, alternatively 0.5% to 5%, alternatively 1% to 5%, and alternatively 1% to 2%, based on combined weights of starting materials A), B), C), D), and E) used in step 1) of the method. Alternatively, when the method will be performed batchwise with a homogeneous catalyst, the amount of catalyst may be >0 to 1%. Alternatively, when the method will be run continuously, the amounts of catalyst may differ. For example, a heterogeneous catalyst may be used in a packed bed for a continuous process, where the amount of catalyst will depend on the size of the reactor.

The starting materials used in the method may optionally further comprise one or more additional starting materials. For example, the additional starting materials may be selected from the group consisting of D) water, E) an endblocker, or both. Water may optionally be added to the starting materials used in the method to improve the reactivity of the catalyst. For example, when the catalyst is an ion exchange resin provided in a dry form or reused from one batch to another, water may be added to reactivate the catalyst. The amount of water may vary, however, the amount of water may be as described in U.S. Pat. No. 8,686,175.

The endblocker differs from starting materials A) and B) and may have unit formula $(R_3SiO_{1/2})_e(R_2HSiO_{1/2})_f(R_2SiO_{2/2})_g(RHSiO_{2/2})_h$, where R is as described above, subscript e is 0, 1, or 2; subscript f is 0, 1 or 2; a quantity (e+f)=2; subscript g≥0, subscript h≥0; and 0≤(g+h)≤3. Alternatively, the quantity (g+h) may be 0 to 2, and alternatively 0 to 1. Endblockers are known in the art and are commercially available. Examples include 1,1,1,3,3,3-hexamethyldisiloxane and 1,1,1,3,3,5,5,5-octamethyltrisiloxane, both of which are available from Sigma-Aldrich, Inc. and/or other sources such as Dow Silicones Corporation or Gelest, Inc. The endblocker is optional, and may be used in an amount of 0 to 44.5%, alternatively 0 to 40%, alternatively 0 to 30%, alternatively 0 to 25%, based on combined weights of starting materials A), B), C), D) and E). The balance of the starting materials used in the method may be starting materials A) and B). Alternatively, starting materials A) and B) may comprise 45.5 weight % to <100 weight %, alternatively 50% to <100%, alternatively 60% to <100%, and alternatively 75% to <100%, based on combined weights of starting materials A), B), C), D) and E) used in the method.

Steps 1) and 2) of the method may be performed by any convenient means using conventional equipment. For example, the starting materials may be combined in a jacketed vessel equipped with an agitator. The starting materials may be added to the vessel in any order. Steps 1) and 2) may be performed sequentially or concurrently. Step 2) may be performed by mixing with the agitator while controlling temperature in the vessel at a temperature of 20° C. to 110° C., alternatively 23° C. to 80° C., as the equilibration reaction occurs.

The equilibration reaction described herein is illustrated by the following exemplary reaction scheme:

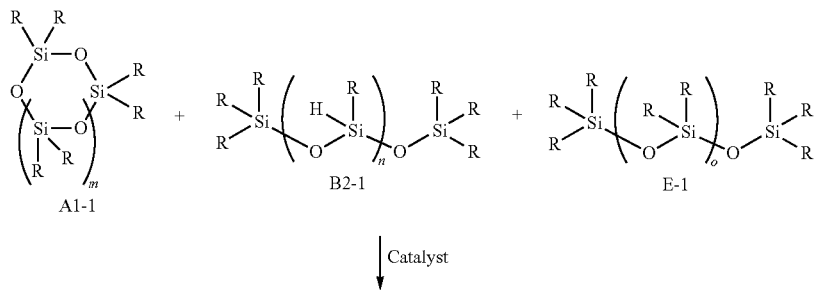

-continued

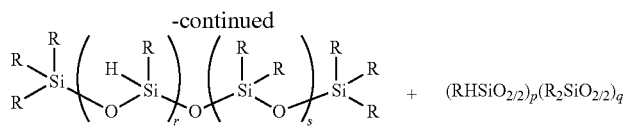

$+ \quad (RHSiO_{2/2})_p(R_2SiO_{2/2})_q$ where R is as described above, subscript m is 1 to 10, subscript n is 3 to 200, subscript o is 0 to 3, and a quantity (p+q)≤3, largely 3 to 9, and a quantity (r+s) =10 to 300. Alternatively, subscript s may be 30 to 250, and subscript r may be 3 to 70. Alternatively, each R may be methyl, subscript m may have an average value of 2, subscript n may have an average value of 70, alternatively 60 to 70, and subscript o may be 0. In the reaction scheme above, the reaction includes equilibration of ≡Si—O—Si≡ bonds from one molecule to another, including ring opening of the cyclic siloxane and endblocking by the endblocker shown above. It may be desirable to produce a fully equilibrated product.

Using the reaction scheme above, in step 2), a poly (diorgano/organohydrogen) siloxane copolymer product and a mixed cyclic by-product form. The copolymer comprises D units of formula ($R_2SiO_{2/2}$) and $D^H$ units of formula ($RHSiO_{2/2}$). Without wishing to be bound by theory, it is thought that during step 2), the copolymer when first formed has a blocky distribution of the difunctional units, i.e., blocks of $D^H$ units and blocks of D units. Over time as the equilibrium reaction progresses, the position of the D and $D^H$ units will change to a more randomized sequence in the backbone of the copolymer. A vibrational spectroscopy technique can be used to determine absorbance bands (peaks on spectra) corresponding to coupled $D^H$ units and decoupled $D^H$ units. Coupled refers to a $D^H$ unit adjacent to another $D^H$ unit in a copolymer backbone. Decoupled refers to a $D^H$ unit not adjacent to another $D^H$ unit in a copolymer backbone.

The inventors found that a vibrational spectroscopy technique, e.g., infrared (IR) spectroscopy or Raman spectroscopy, can be used to monitor the reaction mixture in real time in step 3) of the method described above. Furthermore, the vibrational spectroscopy technique can be used to monitor the reaction mixture in situ. While in the past, IR and Raman spectroscopy have been used to measure the concentration of the substituents present in polyorganohydrogensiloxanes (e.g., which substituents are bonded to the silicon atoms and in which amounts), these vibrational spectroscopy techniques have previously not been used to detect the sequence of siloxane units (e.g., sequence of D and $D^H$ units) in the copolymer backbone. The inventors surprisingly found that the vibrational spectroscopy techniques can detect changes in the sequence (e.g., blocky or random sequence) of D and $D^H$ units in the copolymer backbone. Furthermore, the vibrational spectroscopy techniques described herein can be used for copolymers with a D:$D^H$ ratio of at least 1:1, alternatively at least 1.5:1 and alternatively at least 2:1. At the same time, the D:$D^H$ ratio of the copolymer may be up to 30:1, alternatively up to 15:1, alternatively up to 10:1, alternatively up to 5:1, and alternatively up to 3:1. Alternatively, the vibrational spectroscopy techniques described herein can be used for copolymers with a D:$D^H$ ratio of 1:1 to 30:1, alternatively 1:1.5 to 1:2.5, and alternatively 1:2 to 1:3. Alternatively, the vibrational spectroscopy techniques described herein can be used for copolymers with a D:$D^H$ ratio of 100:1 to 1:100, alternatively 75:1 to 1:75; alternatively 50:1 to 1:50; alternatively 30:1 to 1:30; alternatively 5:1 to 1:5, alternatively 3:1 to 1:3, alternatively 2.5:1 to 1:2.5; alternatively 2:1 to 1:2, and alternatively 1.5:1 to 1:1.5.

The intensities of the absorbance bands (i.e., peak height and/or peak area on a spectrum measured by a vibrational spectroscopy technique) may be measured after time intervals, as the equilibration reaction progresses. The peak area and peak height of the decoupled SiH absorbance band increases with increasing reaction time while the peak area and peak height of the coupled SiH absorbance band decreases with increasing reaction time. U.S. Patent Application 2004/0198927 discloses equipment for measuring intensities of absorbance bands (to obtain peak heights and peak areas) using vibrational spectroscopy techniques. These absorbance band features can be used to set targets for when to stop the reaction to optimize properties of the poly(diorgano/organohydrogen)siloxane copolymer and/or to optimize reaction batch time. Targets can be set based on the decoupled SiH peak area, decoupled SiH peak height, coupled SiH peak area, and/or coupled SiH peak height. The reaction can be controlled by stopping the reaction when the value for any one or more of these features reaches the target. One skilled in the art could set the targets for each of these parameters to optimize application performance while minimizing batch time. Targets could also be set based on the rate of change of any of these parameters. For example, as the reaction proceeds the decoupled SiH peak area increases until it reaches a maximum value and then levels out as shown in, e.g., FIG. 2 below.

A rate of change in the intensity of each absorbance band may be calculated over each time interval. When the rate of change approaches zero, this indicates that the copolymer is fully equilibrated (with a random distribution of D and $D^H$ units). Therefore, when a random copolymer is desired, the target may be set, for example, at a value of 0% to 10% of the maximum absolute value rate of change over a selected time interval, such as a 15-minute-average value measurable during the course of the equilibration reaction for stopping the reaction in step 4). Alternatively, the target could also be set to stop the reaction when the rate of change reaches a predetermined value for any of the features of decoupled SiH peak area, decoupled SiH peak height, coupled SiH peak area, or coupled SiH peak height, as described and exemplified below in the EXAMPLES herein. Alternatively, the target could also be set to stop the reaction when the decoupled SiH peak height or decoupled SiH peak area reaches its maximum, or 90% to 100% of its maximum. Alternatively, the target could be set to stop the reaction when the coupled SiH peak height or coupled SiH peak area reaches its minimum, or 0% to 10% of its minimum. One or more of the features described herein can be used to set the target and/or determine when the target has been reached. Alternatively, a mathematical transformation to peak height, peak area, or rate of change data may be used to smooth the resulting data, including but not limited to averaging across multiple instrument readings or fitting data to a mathematical equation (such as exponential decay or logistic functions). Chemometric analysis such as classical least squares (CLS), partial least squares (PLS), principle component regression (PCR) can also be used in lieu of the univariate analysis mentioned above for setting the target.

Stopping the reaction in step 4) may be performed by any convenient means, such as cooling and/or filtering to remove the catalyst (when a heterogeneous catalyst is used) or neutralizing with a quenching agent (when a homogeneous catalyst is used) to form a salt, which can then be removed by filtering in a batch or continuous mode.

The method described herein may optionally further comprise one or more additional steps. For example, the method may further comprise step 5): recovering the poly(diorgano/organohydrogen)siloxane copolymer. During the equilibrium reaction, a by-product (such as the mixed cyclic described above in the exemplary reaction scheme) may form and/or unreacted starting materials A) and/or B) may be present in the reaction mixture. Recovering may be performed, for example, by any convenient means such as stripping and/or distilling to remove unreacted starting materials and/or by-products from the poly(diorgano/organohydrogen)siloxane copolymer.

The method may optionally further comprise step 6): repeating steps comprising 1) to 4) (and optionally 5) while reusing the catalyst (when a heterogeneous catalyst is used) in step 1). The heterogeneous catalyst may require reactivation, e.g., for example when the catalyst comprises an ion exchange resin, the method may further comprise reactivating the catalyst by a technique comprising adding water to the catalyst before step 6), as described in U.S. Pat. No. 8,686,175.

The method described herein can produce a poly(diorgano/organohydrogen)siloxane copolymer of unit formula: $(R_3SiO_{1/2})_{tt}(R_2HSiO_{1/2})_{uu}(R_2SiO_{2/2})_{vv}(RHSiO_{2/2})_{ww}(RSiO_{3/2})_{xx}(HSiO_{3/2})_{yy}(SiO_{4/2})_{zz}$, where subscripts tt, uu, vv, ww, xx, yy, and zz represent amounts of each unit in the copolymer, subscript tt≥0, uu≥0, vv≥1, ww≥1, xx≥0, yy≥0, zz≥0, with the provisos that a quantity (vv+ww)≥3, a quantity (xx+yy+zz) is 0 to a value sufficient to provide up to 20 mol % of siloxane units in the copolymer molecule; a quantity (tt+uu+vv+ww)≥3. Alternatively, the quantity (tt+uu+vv+ww) may be greater than or equal to 5. Alternatively, (tt+uu+vv+ww) may have a value of 5 to 2,000; alternatively 5 to 1,000; alternatively 10 to 500; alternatively 25 to 300; and alternatively 50 to 200. This copolymer differs from starting materials (A) and (B) in at least one property such as molecular weight, distribution of the $(R_2SiO_{2/2})$ and $(RHSiO_{2/2})$ units, and molar ratio of units of formula $(R_2SiO_{2/2})$ to units of formula $(RHSiO_{2/2})$ (D:D$^H$ ratio). The copolymer also contains both D and D$^H$ units. The D:D$^H$ ratio may be 100:1 to 1:100, alternatively 75:1 to 1:75; alternatively 50:1 to 1:50; alternatively 30:1 to 1:30; alternatively 5:1 to 1:5, alternatively 3:1 to 1:3, alternatively 2.5:1 to 1:2.5; alternatively 2:1 to 1:2, and alternatively 1.5:1 to 1:1.5; alternatively 1:1 to 30:1, alternatively 1:1.5 to 1:2.5, and alternatively 1:2 to 1:3. Alternatively, the copolymer produced by the method described herein may be linear, and when subscripts xx=0, yy=0, and zz=0, the copolymer may have unit formula: $(R_3SiO_{1/2})_{tt}(R_2HSiO_{1/2})_{uu}(R_2SiO_{2/2})_{vv}(RHSiO_{2/2})_{ww}$, subscript tt is 0, 1, or 2; subscript ww is 0, 1, or 2; a quantity (tt+uu)=2; subscript vv>1, subscript ww>1, and where subscripts vv and ww have values such that D:D$^H$ ratio is as described above.

EXAMPLES

The following examples are intended to illustrate the invention to one skilled in the art and should not be interpreted to limit the scope of the invention set forth in the claims. The reactants and other starting materials used in the examples are shown below in Table 1. As used in the following Examples, "Calculated" refers to D:D' and DP of the copolymer calculated based on amounts of each starting material used.

TABLE 1

| Starting Materials | | |
|---|---|---|
| Reactant | Chemical Description | Source |
| D4 cyclics | 1,1,3,3,5,5,7,7-octamethylcyclotetrasiloxane | DSC |
| MeH siloxane | α,ω-trimethylsiloxy-endblocked polymethylhydrogensiloxane with viscosity of 30 centiStokes at 25° C. | DSC |
| Hexamethyldisiloxane | 1,1,1,3,3,3-hexamethyldisiloxane | DSC |
| Catalyst | Dowex 2030 monosphere cationic exchange resin, which is a styrene/divinylbenzene copolymer with sulfonic acid functionality | TDCC |

In Table 1, DSC refers to Dow Silicones Corporation of Midland, Michigan, USA, and TDCC refers to The Dow Chemical Company of Midland, Michigan, USA.

Reference Example A—Infrared Spectroscopy Technique

Reaction progress was monitored using a Mettler Toledo ReactIR 15 with the following configuration: MCT Detector, SiComp (silicon) probe connected via AgX 9.5 mm×1.5 m Fiber (Silver Halide); Sampling 2800 to 650 at 4 wavenumber resolution; Scan option: AutoSelect; Gain: 1×; Happ-Genzel apodization. Spectra were collected at 1 min interval for 12 hrs.

Reference Example B—Raman Spectroscopy Technique

Reaction progress was monitored by Raman spectroscopy using the following equipment and settings: i-Raman Prime Model BWS475-785-HT Custom probe: BAC101-CUST Details: High Throughput Industrial Raman immersion probe (BAC101), with 0.5" O.D.×10" L Hastelloy C-276 shaft and gold sealed sapphire lens and 785 nm excitation. Raman cut-off at 150 cm$^{-1}$. Laser fiber 105 um core FC/PC terminated Raman fiber 300 um core FC/PC terminated. Fiber cable length 1.5 m. There was a fabricated mesh screen (100×100 mesh, 0.0045" wire diameter) used to fit over the Raman probe to prevent solid phase catalyst particles from entering the focal volume of the immersion optic, which would lead to overwhelming fluorescence.

Reference Example C—Cure Time Measurement (TC90)

Cure rate of an elastomer formulation was measured using a Moving Die Rheometer (Monsanto Rheometer, MDR 2000, serial number 36A1D688). An elastomer formulation (5±0.1 g) was placed between two pieces of Mylar and measured at 120° C. The cure rate, TC90, is a measure of the time required for 90% of the cure to take place and is determined by the time it takes to reach 90% of the maximum torque for a given material/measurement.

In this Example 1, Hexamethyldisiloxane (367.01 grams), MeH siloxane (596.66 grams), and D4 cyclics (709.71 grams) were loaded to a 2 L jacketed reactor equipped with a pitched blade impeller and baffles. The reactor head was sealed and the headspace purged with $N_2$ to obtain an inert atmosphere. The water flow to a water condenser was turned on, the agitator set to 600 rpm, and the reaction temperature was controlled to 60° C. by circulating heat transfer fluid through the reactor jacket. Upon reaching the reaction temperature, 8.96 grams of Catalyst was added to the reactor. IR spectra were collected in situ throughout the reaction using a Mettler Toledo React IR 15 Raman spectra were also collected in situ during the reaction using a B&W Tek i-Raman Pro system with a Kaiser immersion optic. The reaction was run for 11.5 hours before the heat was turned off, allowing the reactor contents to cool to ambient temperature. At the end of the reaction, the resulting poly(dimethyl/methylhydrogen)siloxane copolymer had D:D'=1:1, and DP (Calculated)=10.

FIG. 1 below shows the IR spectra collected during the reaction for the reaction in Example 1. The peak area and peak height of the decoupled SiH IR absorbance band increases with increasing reaction time while the peak area and peak height of the coupled SiH IR absorbance band decreases with increasing reaction time. These features can be used to set targets for when to stop the reaction to optimize physical properties of the copolymer and to optimize reaction batch time. Targets can be set based on the decoupled SiH IR peak area, decoupled SiH IR peak height, coupled SiH IR peak area, coupled SiH IR peak height, or a combination of two or more thereof. The reaction can be controlled by stopping the reaction when the value for any of these features reaches a predetermined target. One skilled in the art could set the targets for each of these parameters to optimize application performance while minimizing batch time. Targets could also be set based on the rate of change of any of these features. For example, as the reaction proceeds the decoupled SiH IR peak area increases until it reaches a maximum value and then levels out as shown in FIG. 2. A target could be set, for example, to stop the reaction when the rate of change of the decoupled SiH IR Peak area reaches a value of 0% to 10% of its maximum 15-minute-average absolute value measurable during the course of the equilibration reaction. The target could also be set to stop the reaction when the rate of change reaches a predetermined value for any of the features, decoupled SiH IR peak area, decoupled SiH IR peak height, coupled SiH IR peak area, or coupled SiH IR peak height. The trend in each of these features (or combinations thereof) during the reaction of Example 1 is shown in FIGS. 2-5 below.

FIG. 6 shows the Raman spectra collected during the reaction for Example 1 described above. The peak area and peak height of the decoupled SiH Raman absorbance bands increases with increasing reaction time while the peak height and peak area of the coupled SiH Raman absorbance bands decreases with increasing reaction time. These peak areas and peak heights can be used to set targets for when to stop the SiH reaction to optimize physical properties of the SiH siloxane and to optimize reaction batch time. Targets can be set based on the decoupled SiH Raman peak area, decoupled SiH Raman peak height, coupled SiH Raman peak area, and coupled SiH Raman peak height. The reaction can be controlled by stopping the reaction when the value for any one or more of these features reaches a predetermined target. One skilled in the art could set the targets for each of these parameters to optimize application performance while minimizing batch time. Targets could also be set based on the rate of change of any of these features. For example, as the reaction proceeds the decoupled SiH Raman peak area increases until it reaches a maximum value and then begins to level out as shown in FIG. 11. A target could be set to stop the reaction when the rate of change of the decoupled SiH Raman peak area equals 0 (or a value close to zero), e.g., a value of 0% to 10% of its maximum 15-minute-average absolute value measurable during the course of the equilibration reaction). The target could be set to stop the reaction when the rate of change for any of the features, decoupled SiH Raman peak area, decoupled SiH Raman peak height, coupled SiH Raman peak area, or coupled SiH Raman peak height reaches a predetermined value. The trend in each of these features during the reaction of Example 1 is shown in FIGS. 7-10 below.

In this Example 2, Hexamethyldisiloxane (93.5 grams), MeH siloxane (123.2 grams), D4 cyclics (207.7 grams), and Catalyst (4.3 grams) were loaded to a 500 mL jacketed reactor equipped with a pitched blade impeller and baffles. The reactor head was sealed and inert atmosphere established with $N_2$ blanket. The water flow to a water condenser was turned on, the agitator set to 750 rpm, and the reactor jacket temperature was controlled to 60° C. using a circulator and heat transfer fluid. The IR spectra were collected in situ during the reaction using a Mettler Toledo React IR 15 instrument. The reaction was run for 24 hours before the heat was turned off, allowing the reactor contents to cool to ambient temperature. When the reaction was complete the resulting poly(dimethyl/methylhydrogen)siloxane copolymer had D:D' (Calculated)=1.5:1 and DP (Calculated)=12.

The trend in the decoupled SiH IR peak area with respect to time is shown by way of example in FIG. 15 below. The reaction can be stopped when the decoupled SiH IR peak area reaches a predetermined target value. One skilled in the art could set the target to optimize physical properties for a given application while minimizing batch time. The reaction could also be stopped when a targeted rate of change with respect to time in the decoupled SiH IR peak area is reached. The target for the rate of change could be determined by one skilled in the art to optimize physical properties for a given application, as described above in Example 1.

In this Example 3, Hexamethyldisiloxane (44.6 grams), MeH siloxane (857.5 grams), and D4 cyclics (1032.6 grams) were loaded to a 2 L jacketed reactor equipped with a pitched blade impeller and baffles. The reactor head was sealed and inert atmosphere established with $N_2$ blanket. The water flow to a water condenser was turned on, the agitator set to 750 rpm, and the reactor jacket temperature was controlled to 60° C. using a circulator and heat transfer fluid. Catalyst (21.3 grams) was added to the reactor upon reaching the temperature setpoint of 60° C. The IR spectra were collected in situ during the reaction using a Mettler Toledo React IR 15 instrument. The reaction was run for 24 hours before the heat was turned off, allowing the reactor contents to cool to ambient temperature. When the reaction was complete the resulting poly(dimethyl/methylhydrogen)siloxane copolymer had D:D' (Calculated)=1:1 and DP (Calculated)=60.

The trend in the decoupled SiH IR peak area with respect to time is shown by way of example in FIG. 16 below. The reaction can be stopped when the decoupled SiH IR peak area reaches a predetermined target value. One skilled in the art could set the target to optimize physical properties for a given application while minimizing batch time. The reaction could also be stopped when a targeted rate of change in the decoupled SiH IR peak area with respect to time is reached. The target for the rate of change could be determined by one skilled in the art to optimize physical properties for a given application, as described above in Example 1.

In this Example 4, Hexamethyldisiloxane (21.43 grams), MeH siloxane (448.0 grams), and D4 cyclics (1483.6 grams) were loaded to a 2 L jacketed reactor equipped with a pitched blade impeller and baffles. The reactor head was sealed and inert atmosphere established with $N_2$ blanket. The water flow to a water condenser was turned on, the agitator set to 750 rpm, and the reactor jacket temperature was controlled to 60° C. using a circulator and heat transfer fluid. Catalyst (21.3 grams) was added to the reactor upon reaching the temperature setpoint of 60° C. The IR spectra were collected in situ during the reaction using a Mettler Toledo React IR 15 instrument. The reaction was run for 24 hours before the heat was turned off, allowing the reactor contents to cool to ambient temperature. When the reaction was complete the resulting poly(dimethyl/methylhydrogen)siloxane copolymer had D:D'(Calculated)=2.8:1 and DP (Calculated)=107.

The trend in the decoupled SiH IR peak area with respect to time for this Example 4 is shown by way of example in FIG. 13 below. The reaction can be stopped when the SiH IR peak area reaches a predetermined target value. One skilled in the art could set the target to optimize physical properties for a given application while minimizing batch time. The reaction could also be stopped when a targeted rate of change in the decoupled SiH IR peak area with respect to time is reached. The target for the rate of change could be determined by one skilled in the art to optimize physical properties for a given application, as described above in Example 1.

In this Example 5, Hexamethyldisiloxane (318.7 grams), MeH siloxane (735.2 grams), and D4 cyclics (869.4 grams) were loaded to a 2 L jacketed reactor equipped with a pitched blade impeller and baffles. The reactor head was sealed and inert atmosphere established with $N_2$ blanket. The water flow to a water condenser was turned on, the agitator set to 750 rpm, and the reactor jacket temperature was controlled to 60° C. using a circulator and heat transfer fluid. Catalyst (21.0 grams) was added to the reactor upon reaching the temperature setpoint of 60° C. The IR spectra were collected in situ during the reaction using a Mettler Toledo React IR 15 instrument. The reaction was run for 24 hours before the heat was turned off, allowing the reactor contents to cool to ambient temperature. When the reaction was complete the resulting poly(dimethyl/methylhydrogen) siloxane copolymer had D:D' (Calculated)=1:1 and DP (Calculated)=12.

The trend in the decoupled SiH IR peak area with respect to time is shown by way of example in FIG. 14. The reaction can be stopped when the SiH IR peak area reaches a predetermined target value. One skilled in the art could set the target to optimize physical properties for a given application while minimizing batch time. The reaction could also be stopped when a targeted rate of change in the decoupled SiH IR peak area with respect to time is reached. The target for the rate of change could be determined by one skilled in the art to optimize physical properties for a given application, as described above in Example 1.

Examples 1 through 5 show that the exact time for the decoupled SiH peak to reach a maximum value with minimal rate of change varies depending on several factors including molecular weight of the starting materials and the D:D' ratio.

In this Example 6, Hexamethyldisiloxane, MeH siloxane, and D4 cyclics were loaded into a 500 mL reactor equipped with a pitched blade impeller and baffles and inerted with nitrogen. The amounts of each starting material loaded for each batch in this example is shown below in Table 2. The reactions were run as follows: The reactor head was clamped down, and the $N_2$ blanket was confirmed. The water flow to the water condenser was turned on, the agitator set to 750 rpm, and the circulator (reaction temperature: 60° C.) was started to control the heating jacket throughout the course of the reaction. IR spectra were collected in situ using a Mettler Toledo React IR 15 instrument. Each batch was reacted for a different amount of time resulting in different levels of decoupled SiH as shown in Table 3. To stop the reaction at a specified length of time, samples were collected and transferred through a filter to remove the Catalyst.

TABLE 2

| | Raw Material Loading in Example 6 | | | |
|---|---|---|---|---|
| Batch | Catalyst (g) | MeH Siloxane (g) | Hexamethyldisiloxane (g) | D4 Cyclics (g) |
| 1 | 4.6 | 187.5 | 9.7 | 226.0 |
| 2 | 4.7 | 187.4 | 9.7 | 224.8 |
| 3 | 4.6 | 186.7 | 9.6 | 224.7 |
| 4 | 4.7 | 187.6 | 9.5 | 225.5 |
| 5 | 4.6 | 186.8 | 9.5 | 223.7 |
| 6 | 4.6 | 187.1 | 9.5 | 225.6 |
| 7 | 4.6 | 186.5 | 9.7 | 223.9 |

The poly(dimethyl/methylhydrogen)siloxane copolymer prepared in each batch was used as crosslinker to synthesize an elastomer. The same hydrosilylation reaction curable elastomer formulation was prepared, except for using a copolymer from a different batch in each elastomer formulation. The cure time (TC90) was measured for the elastomer made using the different copolymers. The cure time of the elastomer formulations resulting from the different copolymers is shown below in Table 3.

TABLE 3

| Cure Time (TC90) and Decoupled SiH for reactions in Example 6 | | | |
|---|---|---|---|
| Batch | Time (hours) | Decoupled SiH IR Peak Area | TC90 (seconds) |
| 1 | 3 | 2.08 | 144.3 |
| 2 | 4 | 2.44 | 129.1 |
| 3 | 5 | 2.67 | 102.7 |
| 4 | 6 | 2.84 | 81.8 |
| 5 | 8 | 3.05 | 76.1 |
| 6 | 12 | 3.25 | 65 |
| 7 | 16 | 3.32 | 61.4 |

The data in Table 3 shows that as the siloxane equilibration reaction time increased for the batches in Example 6, the decoupled SiH peak area increased (indicating that the randomization of the D and D' units in the copolymer backbone also increased). Increasing randomization of the D and D' units also increased cure speed of the elastomer formulation (as shown by decreasing TC90) in Example 6.

Without wishing to be bound by theory, it is thought that a benefit of the present invention is that the method can be used to select a desired degree of randomization for the D and D' units in the backbone of a poly(diorgano/organohydrogen)siloxane copolymer produced by the method while minimizing batch time. If a fast cure speed is desired for an elastomer formulation in which the copolymer will be used as a crosslinker, a high peak area target, e.g., ≤10% of the maximum 15 minute average absolute value rate of change, can be selected to obtain a highly randomized copolymer, which can increase the cure speed of certain curable elastomer formulations. Alternatively, the target can be set with a lower Decoupled SiH Peak Area (or other suitable target), to minimize batch time to produce the copolymer, e.g., when having a copolymer with a more blocky structure is acceptable.

INDUSTRIAL APPLICABILITY

Poly(diorgano/organohydrogen)siloxane copolymers, such as the polyorganohydrogensiloxanes produced by the reaction described in U.S. Pat. No. 8,686,175 are intermediates useful for synthesis of various organofunctional siloxane products. In particular, such copolymers having D units of formula $(R_2SiO_{2/2})$ and $D^H$ units of formula $(RHSiO_{2/2})$ are useful, for example, as crosslinkers in various cure systems, such as condensation and/or hydrosilylation reaction curable products. The polyorganohydrogensiloxanes produced as described in described in U.S. Pat. No. 8,686,175 can have blocky backbone structures (e.g., $DDDDD^HD^HD^HD^HDDD$) where multiple D units are grouped together and multiple $D^H$ units are grouped together in 'blocks'. However, without wishing to be bound by theory, the inventors found that more random backbone structures (e.g., $DDDDD^HDDDD^HDD^HDD-D^HDDDDDDDD^H$) where the D and $D^H$ units are more randomly distributed along the backbone may be desirable for certain applications, such as use of the poly(diorgano/organohydrogen)siloxane copolymers in curable silicone compositions, such as hydrosilylation reaction curable silicone elastomer compositions. Furthermore, the polyorganohydrogensiloxane produced described in U.S. Pat. No. 8,686,175 may reach its target molecular weight at a different time than (sometimes well before) the distribution of D and $D^H$ units in the backbone are randomly distributed. This can result in varying degrees of "randomness" in the backbone structure of the siloxane from batch to batch and impact physical properties and performance. And, degree of randomness can impact performance of the copolymer as a crosslinker. As shown above in Example 6, copolymers with more random structures produced by the method described herein provided the benefit of faster cure speed when formulated into a hydrosilylation reaction curable elastomer composition. The method described herein may be used to both minimize batch time and maximize randomization of the poly(diorgano/organohydrogen)siloxane copolymer by appropriate selection of the target for stopping the reaction in the method described herein.

DEFINITIONS AND USAGE OF TERMS

All amounts, ratios, and percentages are by weight unless otherwise indicated. The amounts of all starting materials in a composition total 100% by weight. The Summary and the Abstract are hereby incorporated by reference. The articles 'a', 'an', and 'the' each refer to one or more, unless otherwise indicated by the context of specification. The singular includes the plural unless otherwise indicated. The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

The terms "decoupled SiH" and "decoupled $(RHSiO_{2/2})$" refer to the units of formula $(RHSiO_{2/2})$ in the siloxane backbone of a copolymer which are not adjacent to other $(RHSiO_{2/2})$ units. For example, in a moiety $—(R_2SiO_{2/2})—(RHSiO_{2/2})—(R_2SiO_{2/2})—$, the $(RHSiO_{2/2})$ unit is a decoupled $(RHSiO_{2/2})$. The more decoupled SiH in a copolymer backbone, the higher the degree of randomness of the copolymer, with the exception of a completely alternating copolymer backbone, which is not favored by the equilibrium reaction described herein.

The terms "coupled SiH" and "coupled $(RHSiO_{2/2})$" refer to the units of formula $(RHSiO_{2/2})$ that are adjacent to other $(RHSiO_{2/2})$ units. For example, in a moiety $—(RHSiO_{2/2})—(RHSiO_{2/2})—(RHSiO_{2/2})—$, the $(RHSiO_{2/2})$ units are coupled. The more coupled SiH in a copolymer, the more blocky character it has.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "20 to 110" may be further delineated into a lower third, i.e., 20 to 49, a middle third, i.e., 50 to 79, and an upper third, i.e., 80 to 110, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. Furthermore, an individual number within a disclosed range may be relied upon and provides adequate support for specific embodiments within the scope of the appended claims.

Abbreviations used herein are defined in Table 5.

TABLE 5

| Abbreviations | |
| --- | --- |
| Abbreviation | Definition |
| °C. | Degrees Celsius |
| cSt | centistokes |
| DP | Degree of polymerization |
| g | Grams |
| hr | hours |
| min | minutes |
| um | micrometer |

The invention claimed is:

1. A method for preparing a poly(diorgano/organohydrogen) siloxane copolymer, wherein the method comprises:
1) Combining starting materials comprising
   A) a source of siloxane units of formula ($R_2SiO_{2/2}$),
   B) a source of siloxane units of formula ($RHSiO_{2/2}$),
      where each R is independently selected from the group consisting of a monovalent hydrocarbyl group and a monovalent halogenated hydrocarbyl group, and
   C) an acid catalyst,
      thereby forming a mixture;
2) Agitating the mixture at a temperature of 20° C. to 110° C., thereby forming a reaction mixture comprising the poly(diorgano/organohydrogen) siloxane copolymer via equilibration reaction;
3) Using a vibrational spectroscopy technique selected from the group consisting of infra-red spectroscopy and Raman spectroscopy to monitor a spectral region including an absorbance band that corresponds to one or both of a concentration of decoupled ($RHSiO_{2/2}$) and a concentration of coupled ($RHSiO_{2/2}$) units in the reaction mixture;
4) Stopping the equilibration reaction when a target related to the absorbance band is reached.

2. The method of claim 1, where the target is selected from the group consisting of
   i) an absorbance band height,
   ii) an absorbance band area,
   iii) a rate of change of the absorbance band height,
   iv) a rate of change of the absorbance band area,
   v) a mathematical transformation to one or more of i) to iv), and
   vi) a chemometrics analysis of the spectral region including the absorbance band.

3. The method of claim 2, where the target is the rate of change of the absorbance band height or the rate of change of the absorbance band area, and the rate of change has a value of 0% to 10% of its maximum absolute value measurable during the course of the equilibration reaction.

4. The method of claim 2, where the decoupled ($RHSiO_{2/2}$) absorbance band area is used.

5. The method of claim 1, where starting materials A) and B) comprise unit formula ($R_3SiO_{1/2}$)$_t$ ($R_2HSiO_{1/2}$)$_u$ ($R_2SiO_{2/2}$)$_v$($RHSiO_{2/2}$)$_w$ ($RSiO_{3/2}$)$_x$ ($HSiO_{3/2}$)$_y$ ($SiO_{4/2}$)$_z$, where subscripts t, u, v, w, x, y, and z represent amounts of each unit, t≥0, u≥0, v≥1, w≥1, x≥0, y≥0, z≥0, with the provisos that a quantity (v+w) is 3 to 300, a quantity (x+y+z) is 0 to a value sufficient to provide up to 20 mol % of units in the molecule; a quantity (t+u+v+w)≥3.

6. The method of claim 1, where starting material A) is selected from the group consisting of:
   A1) a cyclic polydiorganosiloxane of unit formula ($R_2SiO_{2/2}$) c, where 3≤c is ≤12;
   A2) a linear polyorganosiloxane comprising unit formula ($R_3SiO_{1/2}$)$_a$ ($R_2HSiO_{1/2}$)$_d$($R_2SiO_{2/2}$)$_b$, where each R is independently a monovalent hydrocarbyl group, a quantity (a+d)=2, and 3≤b≤200; and
   A3) a combination of both A1) and A2).

7. The method of claim 1, where starting material B) is selected from the group consisting of:
   B1) a cyclic polyorganohydrogensiloxane of unit formula ($HRSiO_{2/2}$)$_c$, where 3≤c≤12;
   B2) a linear polyorganosiloxane of unit formula ($R_3SiO_{1/2}$)$_a$ ($R_2HSiO_{1/2}$)$_a$ ($RHSiO_{2/2}$)$_e$, where each R is independently a monovalent hydrocarbyl group, a quantity (a+d)=2, and 3≤e≤200; and
   B3) a combination of both B1) and B2).

8. The method of claim 1, where a polydiorganosiloxane comprises both of starting materials A) and B) in the same molecule.

9. The method of claim 1, where the method is run batchwise.

10. The method of claim 1, where the catalyst is a heterogeneous catalyst.

11. The method of claim 1, where the starting materials in step 1) further comprise: D) water.

12. The method of claim 1, where the starting materials in step 1) further comprise E) an endblocker.

13. The method of claim 12, where the endblocker comprises unit formula: ($R_3SiO_{1/2}$)$_e$($R_2HSiO_{1/2}$)$_f$ ($R_2SiO_{2/2}$)$_g$ ($RHSiO_{2/2}$)$_h$, where subscript e is 0, 1, or 2; subscript f is 0, 1 or 2; a quantity (e+f)=2; subscript g≥0, subscript h≥0; and 0≤(g+h)≤30.

14. The method of claim 1, where the monitoring in step 3) is performed via analysis of the reaction mixture in real time and in situ.

15. A method comprising:
1) Combining starting materials comprising
   A) a source of siloxane units of formula ($R_2SiO_{2/2}$),
   B) a source of siloxane units of formula ($RHSiO_{2/2}$),
      where each R is independently selected from the group consisting of a monovalent hydrocarbyl group and a monovalent halogenated hydrocarbyl group, and
   C) an acid catalyst,
      thereby forming a mixture;
2) Agitating the mixture at a temperature of 20° C. to 110° C., thereby forming a reaction mixture comprising the poly(diorgano/organohydrogen) siloxane copolymer via equilibration reaction;
3) Using a vibrational spectroscopy technique selected from the group consisting of infra-red spectroscopy and Raman spectroscopy to monitor a spectral region including an absorbance band that corresponds to one or both of a concentration of decoupled ($RHSiO_{2/2}$) and a concentration of coupled ($RHSiO_{2/2}$) units in the reaction mixture;
4) Stopping the equilibration reaction when a target related to the absorbance band is reached, where the target is a rate of change of the absorbance band height or a rate of change of the absorbance band area, and the rate of change has a value of 0% to 10% of its maximum absolute value measurable during the course of the equilibration reaction, thereby preparing a a poly(diorgano/organohydrogen) siloxane copolymer; and
adding the poly(diorgano/organohydrogen) siloxane copolymer as a crosslinker to a curable silicone formulation.

* * * * *